Figure 1:
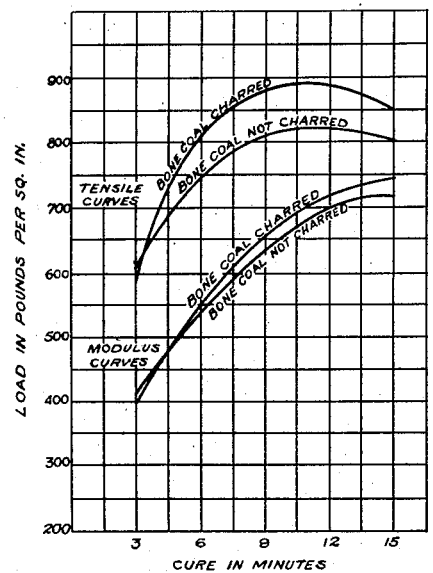

June 12, 1945.  J. F. RUSH  2,378,246

CARBONACEOUS CHAR

Filed Jan. 19, 1942

Inventor
J. F. Rush

By Mason Fenwick & Lawrence
Attorneys

Patented June 12, 1945

2,378,246

UNITED STATES PATENT OFFICE 2,378,246

CARBONACEOUS CHAR

John F. Rush, Morgantown, W. Va., assignor to Sealco By-Products Company, Bluefield, W. Va., a corporation of West Virginia Application January 19, 1942, Serial No. 427,393

5 Claims. (Cl. 252—289)

This invention concerns a carbonaceous char, but particularly a char derived from geological formations associated with bituminous coal. The invention concerns also certain new compositions comprising this new carbonaceous char.

In the arts various fuel substances have been decomposed for the purpose of producing carbon. These various carbons are to be distinguished from the complex char that constitutes the present improvement. Wood has been distilled to yield charcoal and bituminous coal has been distilled to yield coke. The charcoal and the coke are skeletons of the original carbonaceous material and are relatively massive.

Other carbon products are lamp black and carbon black. They are obtained from flames of carbonaceous fuel. These carbons result in general as deposits from decomposing carbonaceous gas. Lamp black and carbon black may be oily; they are soft or gritty depending on various conditions; they are impalpable powders of exceedingly irregular particle form, often ultra-microscopic in arrangement and size. It is difficult to assort them into separate sizes. Their production and their characteristics are reasonably well known in the arts, so need not be further described here.

In coking of coal, the heating is carried on usually at sufficient temperatures to agglomerate the coking material into rather large coherent chunks; in fact, for commercial uses of coke it is desirable to obtain coke in definite chunks and to assure that these chunks possess considerable strength. There have been suggestions to heat bituminous coal while maintaining it in powdered condition; but in such a practice there is no opportunity for amalgamation of the various individual surfaces, and consequently no ultimate provision of fresh surfaces.

Many proposals have been made to use carbonized materials as fillers for various compositions. In some cases, carbon blacks serve not only as fillers but also function to improve the quality of the composition itself. For example, carbon black is incorporated in rubber to increase the tensile strength. However, carbon blacks are relatively expensive, and to produce them requires careful control of decomposition of the gas from which the black is deposited. This entails control of flames from which the carbon black emerges.

This invention concerns a carbonized char which though different from the more expensive blacks, may serve some of their functions, but shall be considerably cheaper. One of the purposes is to form carbonaceous char that may supplant carbon blacks in rubber utilization, and thus release the black for other uses for which it is more necessary. For example, in time of war it may be of considerable importance to compound rubber with carbonaceous char in lieu of with carbon black. While it is no purpose of this invention to produce a material that shall be equal to carbon black in all respects it is nevertheless a purpose to produce at least a partial substitute and one that may impart qualities of its own to compositions in which it is combined. A particular object is to convert bone coal to a product that will improve the strength and the ageing qualities of rubber.

The accompanying drawing presents graphs that illustrate certain physical properties of this coal char as reflected in rubber compositions with which the char is compounded.

Many of the objects stated and others that will appear from this description may be accomplished by certain controlled heating of low grade bituminous coal or mineral deposits of inferior fuel value that are associated in the mine with bituminous coal deposits. Such high-mineral bituminous material is known in mining vernacular as bone coal, or sometimes as gob or sometimes as culm. It will be sufficient in this description and in the accompanying claims to designate these preferred materials as bone coal, but it will be understood that bituminous coal of higher carbon content less ash and often of good coking qualities may be used under this invention.

Benefits of this invention are best accomplished by heating bone coal without air or with only limited access of air; that is, under conditions of destructive distillation, within a limited temperature range of about 600° F. (310° C.) to 875° F. (470° C.). This is a certain narrow range of about 150° C. Air is passed through the carbonizing chamber to remove gases as they are formed, but this amount of air is small and any resulting oxidation of the coal is slight or else is non-existent.

Other conditions to augment the advantages of this heating involve the size of material being treated and involve in particular grinding the heated material in the presence of a protecting and cushioning fluid such as water. The principles to be followed in this practice will be illustrated best by reference to particular conditions that have been found most desirable, but the invention may be practiced without strict adherence to these particular examples.

In the selection of suitable material for this treatment, preference is given to bone coal having a composition of relatively high mineral or ash (incombustible) content. Such a composition from one source that has been found especially suitable is bone coal from the Pond Creek seam of West Virginia and Kentucky bituminous coal. This contained 17.85 percent ash. It contained 51.25 percent fixed carbon and in addition 30.9 percent of volatile material.

This bone coal was reduced to sizes to pass a

¾ inch screen (19 mm.). These small lumps were placed in a rotating drum and heated between 600° F. and 875° F. for a period of 30 minutes to 4 hours. During this time, coal tar distilled in an amount of 7.88 gallons per ton of original bone coal. The product may be termed an intermediate product. This was cooled sufficiently to be ground to a size to pass a 40 mesh sieve, though preferably ground to pass a 100 mesh sieve. These sieves contain openings respectively of 420 microns and of 149 microns.

This charred intermediate product thus reduced to intermediate size then is subjected to a final treatment that is important because of the control it affords of characteristics of the ultimate product. This step involves grinding this charred and broken intermediate product in the presence of water to extremely small size of about 45 microns or less. Suitable wet grinding equipment of itself is known, as for example ball mills for wet grinding. The material now will pass a sieve of 325 meshes, but many of the particles are much smaller than this maximum size. This grinding of this char in the presence of water serves to break open the particles and form new surfaces. These surfaces as they are being formed as fresh surfaces are exposed and covered initially with water. Moreover, in grinding these particular particles under water, there is such cushioning and such distribution of grinding stresses that evidently the final particles are of considerable uniformity. These results appear particularly in rubber compositions containing the particles.

Before proceeding to description of a composition that illustrates certain advantages of this bone coal char, it is desirable to introduce some description of products that serve to identify the preferred range of temperature employed.

One of the desirable qualities of the particles produced under this invention is a black color. This is a function of various contributing factors. Black color is retained if the bone coal is heated to about 875° F. but is destroyed by heating only to a few degrees above this maximum temperature. In other words, excessive heating alters the components of the char in an undesirable way that is reflected in the color of the product. Loss of black color is an indication of these more deep seated alterations that are undesirable.

The finished char which originally contained 30.9 percent volatile material finally contains 23.6 percent volatile material. Ash content in the sample under discussion had increased from 17.85 percent to 20.5 percent. The fixed carbon had increased from 51.25 to 55.9 percent. During this charring there was a distillation of dry coal tar in the amount of 7.88 gallons per ton of original bone coal. The nature of this charring further is indicated by the nature of the volatiles removed. The dry coal tar that was distilled possessed the following characteristics:

Specific gravity $$\frac{15.5°}{15.5°} C.$$

is 1.012.
Insoluble in carbon bisulfide 4.6 percent sludged.
Engler viscosity at 40° C. is 4.4.
Float test on plus 300° C. residue was 139 seconds.
Ring and ball on plus 300° C. residue was 22.5° C.
Tar acids by contact 20.9 percent.
Tar acids by liberation 24.7 percent.

Distillation of coal tar. A. S. T. M. percent by weight:

Up to 170° C., 3.8 percent.
Up to 235° C., 28.2 percent.
Up to 270° C., 22.2 percent.
Up to 300° C., 16.0 percent.
Plus 300° C., 28.4 percent.
Loss, 1.4 percent.

Further identification of the nature of the heating and of the product itself is found in the fact that distillation of the final product yielded 6.2 percent of tar. The tar was dehydrated with sulphuric acid and then distilled. It showed an initial boiling point of 190° F. (88° C.). The tar was distilled from this initial point gradually to 600° F. (316° C.). A yield of heavy oil was obtained in the amount of 31.88 percent. The residue consisted of 68.12 percent pitch coke. Thus it is evident that a considerable amount of certain tarry material is present in the final product, even though the particles are reducible, and are reduced, to a size less than 325 mesh (45 microns or less). It is remarkable that material containing so much tar can be comminuted to such extremely small size.

Peculiar properties of this coal char are reflected in rubber compositions and are illustrated in the drawing.

Figure 1 shows two sets of curves based on bone coal char of this invention combined with rubber. The upper set of curves shows tensile strength of the combination. The lower of the two curves of this group shows that with bone coal not charred tensile strength of the rubber combination increases only slowly. The upper curve shows that this bone coal char increases the tensile strength of the rubber combination rapidly so that when approximately half cured the composition shows as high tensile strength as the non-charred coal shows at its maximum. This is a valuable property inasmuch as the time of cure obviously accelerates manufacturing processes and also minimizes imperfect curing.

The coal char of this invention exhibits in the upper curve of Figure 1 a maximum tensile strength that is considerably greater than that of the uncharred coal in the lower set-up curves. This char with rubber produces a composition having a tensile strength of the order of 2400 pounds. In this figure the modulus is shown to be consistently higher with charred bone coal of this invention.

Figure 2:
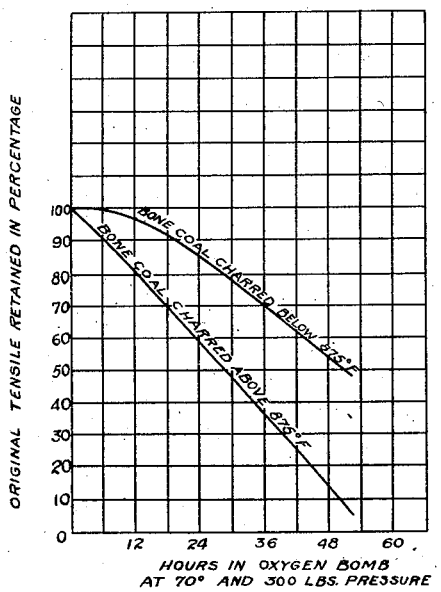

Other evidence of the novelty and peculiar nature of the coal char of this invention is illustrated in Figure 2. This is based on ability of the char to repress ageing of rubber compositions. Ageing shows in weakening of rubber and may be tested by accelerated oxidation of the rubber composition. This is effected by heating the composition in oxygen under pressure. From such tests, the curves of Figure 2 show decrease in the tensile strength as the time of ageing process. Further than this, the curves of Figure 2 show the importance of using char of the present invention, produced at temperatures not materially in excess of 875° F. The lower curve is based on bone coal carbonized above 875° F. This shows that a rubber composition compounded with this highly heated coal manifests a very rapid rate of decrease in tensile strength. Such a composition is said to age rapidly. The upper curve shows a much lower rate of ageing of a composition of rubber comprising bone coal that was charred at a temperature not in excess of 875° F. For example, after 30 hours of the ageing test the rubber composition containing the charred coal of the present invention exhibited as high tensile strength as did the composition containing the more highly heated bone coal at 13 hours of ageing. Or, after 25 hours of ageing the composition containing coal heated above 875° F. had lost as much tensile strength as required 48 hours for the rubber composition containing the char of this invention to lose. This test illustrates a correlation in general between color of the char and such important physical properties as tensile strength. It has been noted previously in this description that above 875° F. the bone coal char lost its desirable black color. This maximum temperature of 875° F. should not be exceeded by even as much as 25° F. or even for a period as little as 4 or 5 minutes inasmuch as such deviation from this invention destroys the valuable properties herein sought.

Figure 3:
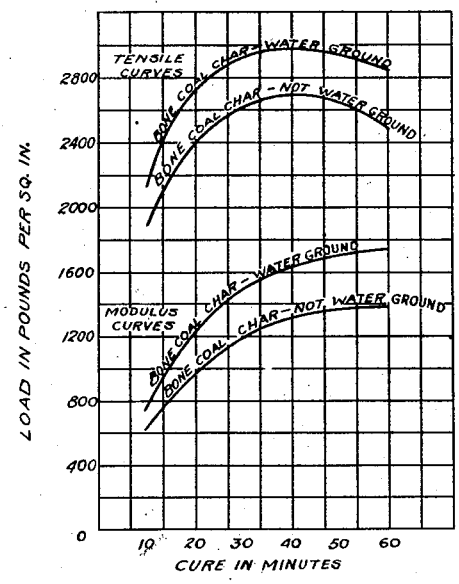

Figure 3 illustrates the importance of that phase of this invention that is based on grinding particles finally under water. With such grinding, the particles as they are broken and the new surfaces as they are formed are surfaces thus protected and the particles themselves acquire new properties. This development of the ultimate surfaces in contact with water is reflected for example in the exceedingly useful property of tensile strength of a rubber mixture containing this char. This is illustrated in Figure 3. In Figure 3, the upper group of curves is concerned with tensile strength and the lower group of curves is concerned with modulus of elasticity. It is clear from these curves that the water ground char presents a high rate of attainment of tensile strength and also presents greater maximum tensile strength than does the char not ground under water. Likewise the modulus for the water ground char is markedly higher both in rate and in maximum values than is the char not ground under water.

The composition of samples having the properties illustrated in the drawing is given for the sake of completeness of description. It will be observed that certain compositions contained over 50 percent reclaimed rubber:

|  | Fig. #1 | Fig. #2 | Fig. #3 |
|---|---|---|---|
| Approximate loading by volume of present char | 35 | 35 | 20 |
| Smoke crepe | | 50 | 50 |
| Pale crepe | 50 | 50 | 50 |
| Xylos #193 reclaimed rubber | 250 | | |
| Stearic acid | 5 | 1 | 1 |
| Sulphur | 7 | 4 | 4 |
| D. P. G. accelerator | 0.5 | 1.5 | 1.5 |
| El 60 | 1.0 | | |
| Zinc oxide | 10 | 5 | 5 |
| Present char | 111 | 58 | 32.25 |
| Total weight grams | 434.5 | 169.5 | 143.75 |
| Total volume | 359.2 | 153 | 134 |
| Specific gravity (theoretical) | 1.21 | 1.11 | 1.07 |
| Specific gravity (found) | 1.23 | 1.11 | 1.08 |
| Milling loss grams | 2.5 | 3.0 | 2.0 |
| Time to incorporate minutes | 5 | 9½ | 6 |

This invention has been described with reference to imparting exceedingly useful properties to bone coal or similar material that now is waste. Such material, it may be noticed, is relatively high in ash. However, some of the advantages of this invention may be obtained with bituminous materials that are usually regarded as better fuels than bone coal. Such materials may contain considerably more volatiles or sometimes may be of the class regarded as coking coal. The fixed carbon of chars under this invention may vary with different materials, within limits of about 50 to 70 percent of the char.

While I have in the above description disclosed what I believe to be a preferred and practical embodiment of the invention, it will be understood to those skilled in the art that the specific details of construction and arrangement of parts are subject to some latitude of variation without transcending the spirit and scope of the appended claims.

What I claim is:

1. A process of preparing a char comprising heating bituminous coal to a temperature not exceeding 875° F. to expel part of its volatile content, and then grinding the resulting material under water to particles of about 45 microns.

2. A process of preparing a char comprising heating bone coal at temperatures within a range substantially embraced between 600° and 875° F. to expel a portion only of its volatile content, and then grinding the char under water to particle size less than 45 microns.

3. A process of preparing a char comprising heating bone coal in lumps of about three-fourths inch to temperatures within a range substantially embraced between 600° and 875° F., then reducing this product to about 40 to 100 mesh size, and then grinding the material under water to particles of about 45 microns.

4. A process of preparing a char comprising heating bone coal to about 875° F. to a content of about 50 to 70 percent fixed carbon, and grinding this product under water to particles of about 45 microns.

5. A process of preparing a char comprising heating bone coal containing about 51 percent fixed carbon, 31 percent volatile material and 17 percent ash, at temperatures within a range substantially embraced between 600° and 875° F. for a time up to about 4 hours to obtain material of about 56 percent fixed carbon, 23 percent volatile material and 20 percent ash, and grinding this material under water to particle size of about 45 microns, the particles containing about 6 percent of a tar from which about 32 percent of heavy oil is distilled up to temperatures of 600° F.

JOHN F. RUSH.